United States Patent [19]

[11] 4,177,784

Tatsutomi et al.

[45] Dec. 11, 1979

[54] ENGINE STARTING DEVICE

[75] Inventors: Yasuo Tatsutomi; Hideo Shiraishi; Takashi Hamamoto, all of Hiroshima, Japan

[73] Assignee: Toyo Kogyo Co., Ltd., Hiroshima, Japan

[21] Appl. No.: 861,446

[22] Filed: Dec. 16, 1977

[30] Foreign Application Priority Data

Dec. 21, 1976 [JP] Japan .......................... 51/172023[U]

[51] Int. Cl.[2] ........................ F02N 17/00; F02C 33/04

[52] U.S. Cl. ........................ 123/179 G; 123/119 DB; 261/65

[58] Field of Search ....... 123/119 DB, 124 R, 179 G, 123/DIG. 11, 103; 261/65

[56] References Cited

U.S. PATENT DOCUMENTS

| | | | |
|---|---|---|---|
| 2,230,184 | 1/1941 | Horton | 123/179 G |
| 2,675,216 | 4/1954 | Eickmann | 261/65 |
| 2,747,848 | 5/1956 | Kehoe | 261/65 |
| 2,782,025 | 2/1957 | Olson | 261/65 |
| 3,669,676 | 6/1972 | Garretson et al. | 123/119 DB |
| 3,752,141 | 8/1973 | Charron et al. | 261/65 |
| 3,895,615 | 7/1975 | Schubeck | 123/DIG. 11 |
| 4,020,813 | 5/1977 | Hattori et al. | 123/124 R |

*Primary Examiner*—Charles J. Myhre
*Assistant Examiner*—David D. Reynolds
*Attorney, Agent, or Firm*—Wenderoth, Lind & Ponack

[57] ABSTRACT

Engine starting device which, if engine temperature is at a level such that vaporized fuel may be present in a carburetor while an engine is stopped, causes a throttle valve to open a certain amount when the cranking motor is actuated, whereby such vaporized fuel is rapidly evacuated and an air-fuel mixture having the correct air-fuel ratio to permit rapid starting is supplied to the engine.

4 Claims, 5 Drawing Figures

ENGINE STARTING DEVICE

The present invention relates to an internal combustion engine starting device. More particularly, the invention relates to a device for starting an engine when the temperature in the carburetor portion thereof is high.

It is known that there may be difficulty in starting an internal combustion motor after it has been brought to or close to normal running and then stopped for a short while. It is generally supposed that a main reason for this difficulty is the fact that when the ignition is turned off in order to stop the engine, the engine turns one or more revolutions because of inertia, whereby fuel is not immediately subjected to combustion, and that since the engine is in a heated condition there may be at least partial vaporization of the fuel in the carburetor system, with the result that this fuel is added to the fuel supplied into the carburetor system for the purpose of restarting the engine, thus resulting in a mixture which is in fact too rich to permit starting. Such a problem is liable to occur in internal combustion engines for stationary power plants or motor vehicles in general, and is particularly liable to occur in more recently made motor vehicles equipped with pollution control means such as a thermal reactor, since there is a rapid rise of temperature in the cylinders upon stopping thereof. The problem is also very liable to occur in tropical areas, where ambient temperature is high or after engine over-heating.

To overcome this problem there have been proposed various means, such as disclosed in U.S. Pat. No. 2,230,184 or Japanese Laid Open Publication No. 50-65730, which comprise air bypass duct means or air duct means leading to the carburetor and valve means which is moved to open the air duct means for restarting when the engine temperature is above a certain level, whereby supplementary air is introduced into the carburetor to mix with any fuel which may be present in the carburetor and bring the air-fuel ratio of the air-fuel mixture supplied to the engine to the required range of values. However, in such a means, since for practical purposes it is impossible to meter the amount of excess fuel in the carburetor before starting of the engine, the amount of air supplied into the carburetor is maintained constant, for certain conditions of engine temperature, regardless of the amount of vaporized fuel which may be present in the carburetor. The result is that, as indicated by the dashed line portion between the dotted-line curves of FIG. 1, which plots time, in seconds, required for starting an engine, in other words, time for cranking, against gasoline temperature in the float chamber of the carburetor system of the engine, improvement of starting ability is achieved in the gasoline temperature range of 60° to 70° C., but outside of this range the additional supply of air does not have a sufficient compensating effect, and starting time becomes longer, presumably because the air-fuel mixture supplied to the engine becomes too rich or too lean. It is of course possible to cause the degree of opening of the valve means provided on the air duct means to increase or decrease proportionally to engine temperature, but in this case, construction of the valve means, and more particularly of the associated temperature detection means becomes complex.

It is accordingly an object of the present invention to provide an internal combustion engine starting device which permits efficient starting of an engine under warm engine conditions.

It is another object of the invention to provide an engine starting device which permits the same efficiency of starting of an engine over a wide range of temperature conditions.

It is another object of the invention to provide an engine starting device which has a simple construction and is easily adapted to meet starting condition requirements in different types or sizes of internal combustion engines.

In accomplishing these and other objects, there is provided, according to the present invention, an engine starting device which, when the engine temperature is such as to make possible the presence of vaporized fuel in the engine carburetor, causes the throttle valve of the carburetor to open a certain amount upon actuation of the engine cranking motor, whereby any vaporized fuel in the carburetor is rapidly evacuated via the engine and exhaust gas system, after which an air-fuel mixture ratio, set by the carburetor, is supplied to the engine to permit efficient starting in a short time. With the means of the invention, the results achieved are the same regardless of the amount of vaporized fuel which may be present in the carburetor, since in all cases all of such fuel is evacuated, and there is no need for any fine adjustment of the starting device elements. It will also be noted that in addition to ensuring supply of an air-fuel mixture having the required air-fuel ratio, the starting device of the invention also contributes to improved charging efficiency, since opening of the throttle valve results in supply of the mixture from the slow port and main nozzle as well as from the idle port, whereby the total amount of the mixture, in which the air-fuel ratio is of course set by the carburetor, is increased.

A better understanding of the present invention may be had from the following full description of one preferred embodiment thereof, when read in reference to the attached drawings, in which like numbers refer to like parts, and in which.

Figure 2:
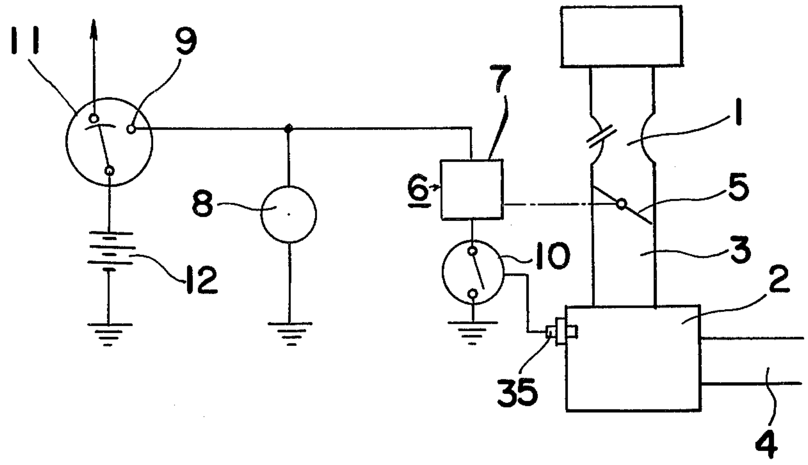
FIG. 2 is a schematic drawing showing the electrical circuit of the invention.

Referring to the schematic drawing of FIG. 2, there is shown a carburetor 1, and an engine 2 which is connected to carburetor 1 via an intake conduit 3 and also has an exhaust gas system 4. In the lower portion of carburetor 1 there is provided a throttle valve 5, which as well as being connected to conventional throttle valve positioning means, is also connected, in a manner described more fully below, to a drive means 6. Drive means 6 comprises a motor 7 which is connected to a cranking motor contact 9 is parallel with cranking motor 8 which is also connected to contact 9. Closure of the circuit to supply power from a battery 12 or similar source is effected by external action to move starter switch 11 from a normally open position to a closed position in which it is closed on contact 9. The power supply circuit of motor 7 includes a normally open thermo-switch 10 which is in series with motor 7 and is connected to a temperature detection means 35, which when the engine temperature is above a certain level closes switch 10. The temperature detection means, which may of course itself constitute switch 10, may be constituted as a bimetallic element, or an element employing wax, for example, and the engine temperature may be detected as the temperature in carburetor 1, the engine water temperature or the oil temperature, for example. In the circuit of FIG. 2, therefore, when starter switch 11 is closed on contact 9 cranking motor 8 is always actuated, and motor 7 is actuated if the engine temperature is higher than a certain set value.

Figure 3:
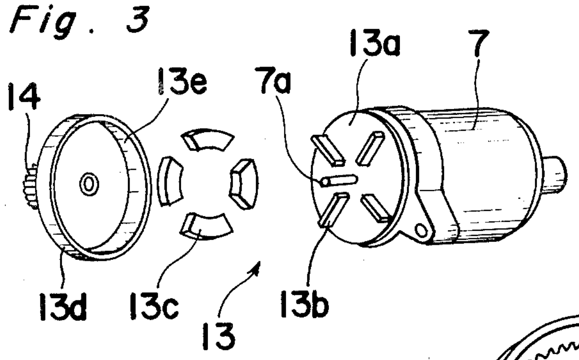
FIG. 3 is a detail view of a coupling in a drive system included in the circuit of FIG. 2.

Referring to FIG. 3, the output shaft **7*a* of motor 7 is fixedly connected to and causes rotation of circular drive-side plate 13*a* of a centrifugal clutch 13. On the outer side of drive-side plate 13*a*, i.e., the side thereof which is outermost with respect to motor 7, there are provided wall elements 13*b* which are disposed radially with respect to the center of plate 13*a*. Between each pair of adjacent wall elements 13*b* there is provided a sector-shaped weight element 13*c* which is of a size such that it can move freely between the corresponding pair of walls 13*b*, and the surface thereof which is outermost with respect to the center of the plate 13*a* is curved with a radius of curvature equal to that of the plate 13*a*. Drive-side plate 13*a* and weight elements 13*c* are contained in a short generally tubular driven-side element 13*d* defining a circular side wall portion the inner surface 13*e* of which fits around and has a radius very slightly greater than that of drive-side plate 13*a*, and an outer wall having a central opening in which the end of motor output shaft 7*a* is freely rotatable. With this arrangement, when motor 7 is actuated, output shaft 7*a* and drive-side plate 13*a* are rotated, and weight elements 13*c* move between the corresponding pairs of wall elements 13*b* away from the center of plate 13*a*, under the effect of centrifugal force, and come into contact with the inner surface 13*e* of driven-side element 13*d* of clutch 13. If at this time there is no force to restrain movement of driven-side element 13*d*, since movement of the weight elements 13*c* in a peripheral direction with respect to plate 13*a* is restricted by the wall elements 13*b*, frictional contact between the weight elements 13*c* and surface 13*e* causes driven-side element 13*d* to rotate together with drive-side plate 13*a*. On the other hand, if there is imposition of an external force restraining movement of driven-side element 13*d*, drive-side plate 13*a* continues to rotate with output shaft 7*a*, but the weight elements 13*c*, although continuing to be moved together with plate 13*a*, simply slide against surface 13*e*, while driven-side element 13*d* remains stationary. A small diameter gear 14 which is disposed coaxially with respect to motor output shaft 7*a* is fixedly attached to the outer surface of driven-side element 13*d* of clutch 13**.

Figure 4:
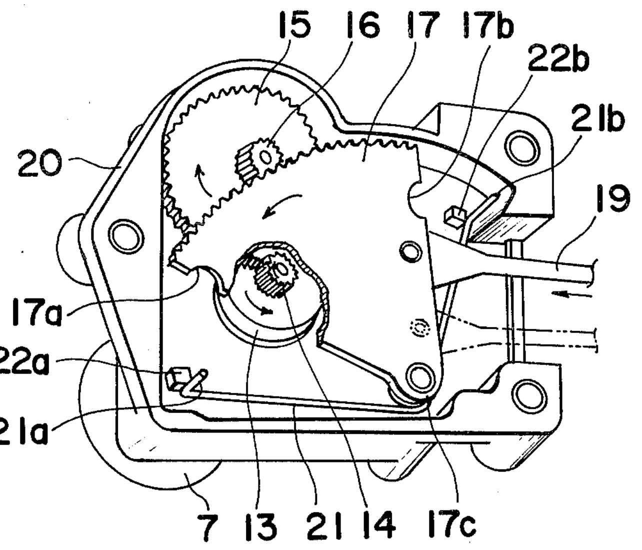
FIG. 4 is a side view of the drive system of the starting device of the invention.

Referring now to FIG. 4, small-diameter gear 14, which when moved rotates counterclockwise as seen in the drawings, engages large diameter reduction gear 15, rotation of which causes rotation of a pinion 16 which is fixedly mounted on the same shaft as reduction gear 15 and engages the gear-tooth portion of a sector gear 17. Reduction gear 15, pinion 16, and sector gear 17 are rotatably mounted inside a casing 20, and motor 7 is fixedly supported on the outer side of casing 20.

Sector gear 17 is rotatably supported on a pin **17*c* fixedly mounted in casing 20, and in the left and right side portions thereof as seen in the drawing there are indented stop engagement portions 17*a* and 17*b*, which respectively engage stops 21*a* and 21*b* defined by the bent opposite end portions of a wire spring 21. The central portion of wire spring 21 is wound around sector gear support pin 17*c* and the opposite end portions thereof press against block elements 22*a* and 22*b*, which thus serve to hold the stop 21*a* and 21*b* defined by the ends of wire spring 21**.

With this arrangement, when small-diameter gear 14 is rotated counterclockwise as seen in the drawing, sector gear 17 is pivoted counterclockwise until the stop engagement portion **17*a* in the left side portion thereof comes into engagement with the stop 22*a*, which prevents further counterclockwise movement of sector gear 17. When this happens, even if motor 7 continues to be actuated, rotation of pinion 16 and reduction gear 15 and hence of small-diameter gear 14 and clutch driven-side element 13*d* is stopped, but clutch drive side plate 13*a*** continues to rotate, as noted above.

One end of a rod 19 is pivotally attached to the right side of sector gear 17. Rod 19 extends rightwards, more or less at right angles to the right side of sector gear 17, and is constrained to move leftwards and rightwards respectively as sector gear 17 rotates counterclockwise or clockwise.

Figure 5:
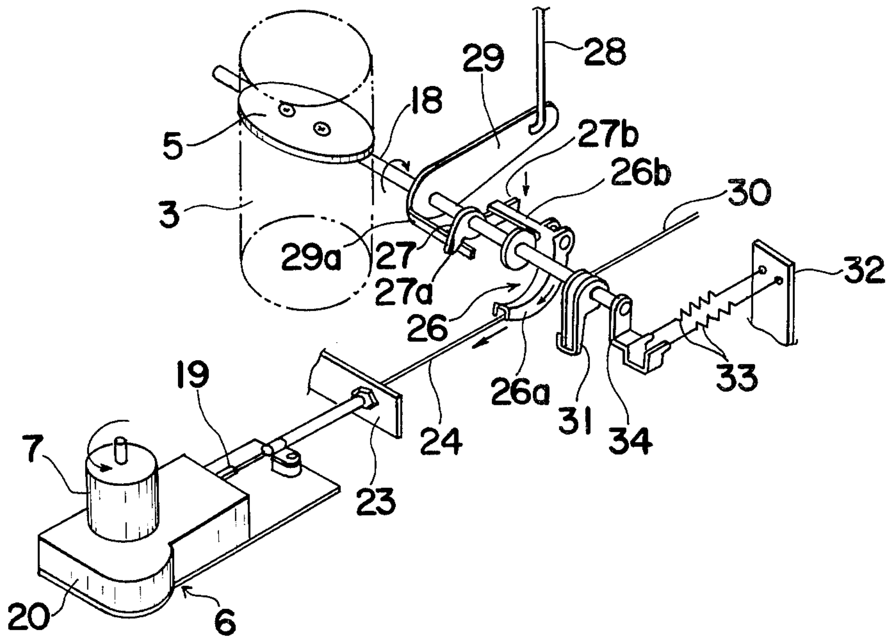
FIG. 5 is a perspective overall view of the starting device of the invention.

Referring to FIG. 5, the outer end of rod 19 is fixedly attached to one end of a wire 24, which is slidably supported in a bearing bracket element 23. The other end of wire 24 is fixedly attached to arcuate arm **26*a* of a first lever 26, which is rotatably mounted on the actuation shaft 18 of throttle valve 5, the disposition of first lever 26 being such that the arcuate arm 26*a* thereof curves under throttle valve shaft 18 and towards rod 19 in the drive unit 6. First lever 26 also comprises a straight arm 26*b* which is disposed generally parallel to and level with throttle valve shaft 18 and extends towards carburetor 1, and the outer end portion of which contacts the upper side of arm 27*b* of a second lever 27 fixedly mounted on throttle valve shaft 18. Second lever 27 comprises another arm 27*a* and is disposed so that the arms 27*a* and 27*b* thereof are on opposite sides of and extend at right-angles to the axis of shaft 18**.

As in conventional means, there is also attached to shaft 18 a choke lever 29 connected to choke side link 28, a throttle lever 31 connecting via wire 30 and other known elements not shown to an accelerator pedal, and a return lever 34 which is attached one end of each of spring means 33, which have the opposite ends attached to a fixed bracket 32 and exert a constant force to rotate shaft 18 in a direction to close throttle valve 5. Choke lever 29 comprises a fixedly attached engagement arm **29*a*, which extends generally parallel to shaft 18, away from carburetor 1, and contacts the lower side of arm 27*a* of second lever 27**.

The above described means functions as follows. In FIG. 2, if the engine temperature reaches a high value, above a set temperature at which there is a possibility of vaporized fuel being present in carburetor 1, temperature-controlled switch 10 closes, and if now the starter switch 11 is closed on contact 9, motor 7 of drive unit 6 is actuated simultaneously with cranking motor 8. In FIG. 4, actuation of motor 7 causes sector gear 17 to be pivoted counterclockwise and rod 19 to be drawn leftwards until the stop engagement portion **17*a* of sector gear 17 comes into engagement with stop 21*a*. In FIG. 5, wire 24 is drawn leftwards simultaneously with rod 19 and causes first lever 26 to pivot about throttle valve shaft 18 in the direction indicated by the arrow in the drawing, whereby arm 26***b* of first lever 26 presses on arm 27*b* of second lever 27 and causes second lever 27 to turn in a direction causing shaft 18 to rotate in the direction to open throttle valve 5.

The dimensions of the various elements of the abovedescribed engine starting device are such that when stop engagement portion 17*a* of sector gear 17 has been brought into engagement with stop 21*a*, the degree of opening to which throttle valve 5 is moved is 22°. Needless to say, however, the degree of throttle valve opening in this situation can be easily changed in order to meet requirements in different engines by altering the dimensions of sector gear 17, providing stop 21*a* in a different position, or, as indicated by the two-dot chain line portion of FIG. 4, changing the point of attachment of rod 19 to sector gear 16, for example. Alternatively, stops can be provided in association with first lever 26. For most purposes, the range of throttle valve movement effected by the drive unit 6 is suitably from the fully closed position to 17° to 25°.

If the starter switch 11 is returned to the open position, or if the engine temperature is below the set value and temperature-controlled switch 10 is opened, presuming no force is applied on throttle lever 31, spring means 33 act to rotate shaft 18 in a direction to close throttle valve 5, whereupon second lever 27 pushes first lever 26 back to its original position, and first lever 26 pulls wire 24 and rod 19 rightwards, thus causing sector gear 17 to be pivoted clockwise and pinion 16, reduction gear 15 and small-diameter gear 14 to be rotated in the directions opposite to the directions indicated by the arrows in FIG. 4, until stop engagement portion 17*b* of sector gear 17 comes into engagement with stop 21*b*. This reverse rotation of the various gear elements does not cause reverse rotation of motor 7 since the weight elements 13*c* of centrifugal clutch 13 remain near the center of drive-side plate 13*a* and driven-side element 13*d* simply turns around plate 13*a*. When the engine temperature is high and throttle valve 5 is opened in the abovedescribed manner, any vaporized fuel which may be present in the carburetor, especially on the upstream side of throttle valve 5, will be rapidly evacuated via the engine 2 and exhaust system 4, after which a mixture having a requisite air-fuel ratio can be supplied to engine 2 regardless of temperature and with high charging efficiency.

Figure 1:
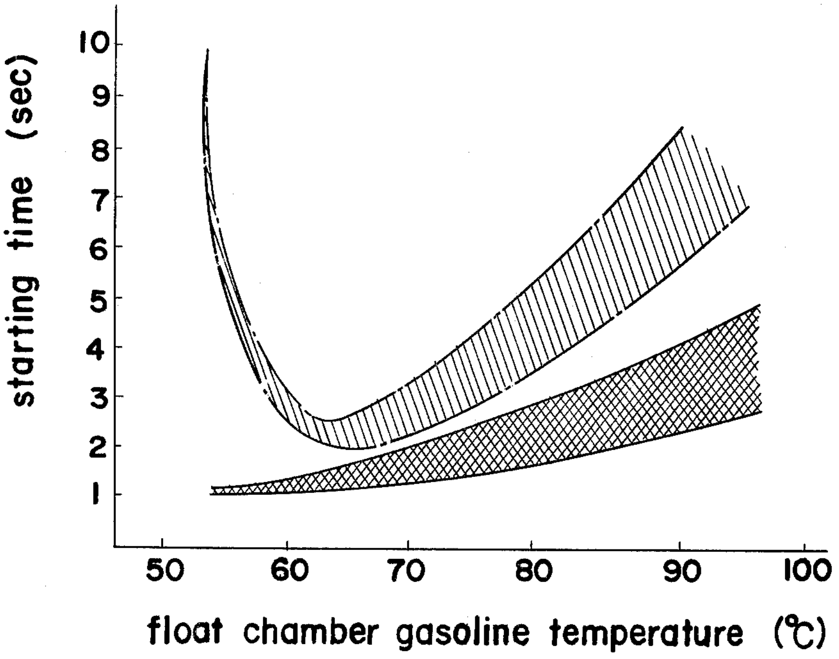
FIG. 1 is a graph plotting starting time in seconds against float chamber gasoline temperature in engines employing conventional starting devices and engines employing a starting device according to the invention.

The advantages of the engine starting device of the invention can be appreciated by reference back to FIG. 1, in which the crossed line portion between the solid line curves indicates the range of starting times at different temperatures of float chamber gasoline in engines equipped with the starting device of the invention. It is seen that although there is a certain increase of starting time with increased gasoline temperature, increase of the starting time is much less steep and is also smooth, thus giving the advantage of more stable and more predictable engine performance, and for the complete range of gasoline temperature from about 50° C. to 100° C. the required starting time is less than in engines equipped with conventional starting devices.

Needless to say, in place of the abovedescribed drive unit 6 there may be employed a solenoid unit or other known actuation means, without departure from the principles of the invention. However, the abovedescribed drive unit 6 has the advantage that requisitely large output may be obtained using only a small motor, thus giving the advantages of lightness and low cost.

Although the present invention has been fully described by way of example with reference to the attached drawings, it should be noted that various changes and modifications will be apparent to those skilled in the art. Therefore, unless otherwise such changes and modifications depart from the scope of the present invention, they should be construed as being included therein.

What is claimed is:

1. In an internal combustion engine having a rotatable throttle valve positioning shaft, a carburetor system including an openable and closable throttle valve fixedly mounted on said throttle valve positioning shaft, a main throttle valve control means connected to said throttle valve positioning shaft and externally actuable to turn said throttle valve positioning shaft in a first direction for causing said throttle valve to open, a throttle valve return means exerting a constant force on said throttle valve positioning shaft to turn said throttle valve shaft in a second direction for causing said throttle valve to close, a cranking motor, and a cranking motor power supply circuit including a starter switch which is closable by external action to close said cranking motor power supply circuit, an engine starting device, comprising:

subsidiary throttle valve control means including a first lever means rotatably mounted on said throttle valve positioning shaft, and a second lever means which is fixedly mounted on said throttle valve positioning shaft and is engaged by said first lever means for being moved thereby in said first direction, and which under the force of said throttle valve return means transmitted through said throttle valve positioning shaft is rotatable in said second direction for simultaneously rotating said first lever means in said second direction;

drive means connected to said first lever means for actuating said subsidiary throttle valve control means for rotating said throttle valve positioning shaft in said first direction;

a drive means power supply circuit which connected in parallel to said cranking motor power supply circuit and being closable to energize said drive means and having a normally open thermo-switch therein which is closable to close said drive means power supply circuit; and temperature detection means connected to said thermoswitch for detecting the temperature in at least one portion of said engine and causing said switch to close when the temperature in said portion of said engine exceeds a certain set value.

2. An engine starting device as claimed in claim 1, wherein said drive means comprises a drive motor having an output shaft, centrifugal clutch means connected to said output shaft, rotatable gear means coupled to said drive motor through said clutch means, and linear connection means having one end connected to an off-center portion of said gear means and the opposite end connected to said first lever means.

3. An engine starting device as claimed in claim 1, wherein said subsidizing throttle valve control means and said drive means have dimensions for opening said throttle valve within the range of 17° to 25°.

4. In an internal combustion engine having a rotatable throttle valve positioning shaft, a carburetor system including an openable and closable throttle valve fixedly mounted on said throttle valve positioning shaft, a main throttle valve control means connected to said throttle valve positioning shaft and externally actuable to turn said throttle valve positioning shaft in a first direction for causing said throttle valve to open, a throttle valve return means exerting a constant force on said throttle valve positioning shaft to turn said throttle valve shaft in a second direction for causing said throttle valve to close, a cranking motor, and a cranking motor power supply circuit including a starter switch which is closable by external action to close said cranking motor power supply circuit, an engine starting device comprising:

subsidiary throttle valve control means actuable to move said throttle valve shaft a certain amount in said first direction;

drive means having a drive motor with an output shaft, centrifugal clutch means connected to said output shaft, rotatable gear means coupled to said drive motor through said clutch means, and linear connection means having one end connected to an off-center portion of said gear means and the opposite end connected to said subsidiary throttle valve control means for actuating said subsidiary throttle valve control means when said drive motor is energized;

a drive means power supply circuit connected in parallel to said cranking motor power supply circuit and being closable to energize said drive motor and having a normally open thermo-switch therein which is closable to close said drive means power supply circuit; and temperature detection means connected to said thermo-switch for detecting the temperature in at least one portion of said engine and causing said switch to close when the temperature in said portion of said engine exceeds a certain set value.

* * * * *